(12) United States Patent
Ralph et al.

(10) Patent No.: US 8,506,366 B2
(45) Date of Patent: Aug. 13, 2013

(54) ANIMAL STUNNING

(71) Applicant: Wagstaff Food Services Pty Ltd, Malvern (AU)

(72) Inventors: James Henry Ralph, Malvern (AU); Jeffrey Stewart Owen, Queensland (AU); Alison Holdhus Small, Queensland (AU); David William McLean, Wollongong (AU); Daniel John Gailer, Wollongong (AU)

(73) Assignee: Wagstaff Food Services Pty Ltd., Malvern, Victoria (AU)

( * ) Notice: Subject to any disclaimer, the term of this patent is extended or adjusted under 35 U.S.C. 154(b) by 0 days.

(21) Appl. No.: 13/668,030

(22) Filed: Nov. 2, 2012

(65) Prior Publication Data

US 2013/0130604 A1    May 23, 2013

Related U.S. Application Data

(63) Continuation-in-part of application No. PCT/AU2011/000527, filed on May 9, 2011.

(30) Foreign Application Priority Data

May 7, 2010 (AU) ................................ 2010901954

(51) Int. Cl.
    *A22B 3/06* (2006.01)
(52) U.S. Cl.
    USPC .......................................................... 452/58
(58) Field of Classification Search
    USPC ..................................................... 452/57–60
    See application file for complete search history.

(56) References Cited

U.S. PATENT DOCUMENTS

| 3,973,290 A | * | 8/1976 | Schwartz | 452/57 |
| 4,616,120 A |   | 10/1986 | Maruyama et al. |  |
| 4,875,253 A | * | 10/1989 | Lambooy | 452/58 |
| 4,953,263 A | * | 9/1990 | Lambooy | 452/58 |

(Continued)

FOREIGN PATENT DOCUMENTS

| DE | 4116670 A1 | 11/1992 |
| JP | 09/140324 | 6/1997 |
| WO | WO 2011/137497 | 11/2011 |

OTHER PUBLICATIONS

International Search Report; PCT/AU2011/000527 dated Aug. 8, 2011.

*Primary Examiner* — Richard Price, Jr.
(74) *Attorney, Agent, or Firm* — TraskBritt

(57) ABSTRACT

Described are animal stunning apparatus and methods for inducing rapid unconsciousness and insensibility. The apparatus includes a stunning station in which a live subject animal is located in a confined position and an applicator contacts an application point on the live subject animal's head immediately overlying a frontal portion of the animal's brain and couples microwave radiation to the head. A microwave generator generates microwave energy of a suitable power level and frequency, and a waveguide directs the microwave radiation to the applicator. A switch discontinues the application of microwave radiation effecting heating of the frontal portion of the brain after a period of time sufficient to have raised the temperature of the frontal portion of the brain of the subject animal to thereby induce the unconsciousness and insensibility. The period is sufficient only to rapidly induce insensibility, and is insufficient for the insensibility induced to be irreversible, and insufficient to cause significant heating of deeper brain tissues and including the brain stem.

20 Claims, 4 Drawing Sheets

(56) References Cited

U.S. PATENT DOCUMENTS

| | | | |
|---|---|---|---|
| 5,888,132 A * | 3/1999 | Burnett | 452/141 |
| 5,899,802 A * | 5/1999 | Burnett | 452/141 |
| 6,338,673 B2 * | 1/2002 | Berry et al. | 452/58 |
| 6,471,576 B1 * | 10/2002 | Ross | 452/58 |
| 7,241,212 B2 * | 7/2007 | Horst et al. | 452/58 |
| 7,244,172 B2 * | 7/2007 | Horst et al. | 452/58 |

\* cited by examiner

ANIMAL STUNNING

CROSS REFERENCE TO RELATED APPLICATION(S)

This application is a continuation-in-part application of International Patent Application PCT/AU2011/000527, filed May 9, 2011, designating the United States of America, and published in English as WO 2011/137497A1 on Nov. 10, 2011, that claims priority from Australian Patent Application No. 2010901954 filed May 7, 2010, the contents of the entirety of each of which are incorporated herein by this reference.

TECHNICAL FIELD

This application relates to methods and apparatus for stunning of animals to induce unconsciousness and insensibility enabling processing or handling of the animal.

BACKGROUND

In slaughtering a live animal in an abattoir for production of meat, hide, and other by-products, the animal is usually restrained and then stunned to induce immediate unconsciousness and insensibility. The slaughter can then be performed without avoidable fear, anxiety, pain, suffering and distress. The stunning can also help avoid difficulties and dangers for persons involved in the processing and handling operations. The "stunning" is commonly carried out either by an mechanical process, such as applying concussion by means of a projectile captive bolt (penetrating or non-penetrating mushroom headed knocker) impacted against the skull of the animal, or by electrical current applied to the animal and passed through the brain, or by inhalation of gases such as carbon dioxide, nitrogen or argon.

The terms "stun" or "stunning" are frequently used to refer to irreversible processes, i.e., the "stunning" process causes irreversible damage to the animal, particularly the brain. This may not be a difficult or contentious issue with regard to animal welfare concerns because the slaughter, such as by sticking and exsanguination, immediately follows the stunning and is therefore performed on an irreversibly unconscious and insensible animal.

However, with religious slaughter or ritual slaughter, irreversible stunning is not acceptable. The animal must not be injured or harmed prior to exsanguination. For example, with the Muslim slaughter method or "Halal slaughter", the animal is required to be alive at the time of slaughter. This requirement does not necessarily mean that the animal is not permitted to be first stunned prior to slaughter, as long as there is no injury, e.g., significant damage to the skull, but irreversible stunning may well be unacceptable to comply with the dictated ritual requirements. Likewise with the Jewish or Judaic slaughter method or "Shechita", post-cut stunning of the animal may be permissible, but not irreversible pre-cut stunning that may be deemed unacceptable so that the resulting carcase would not be Kosher.

There have been some references in the published patent literature to use of microwave radiation stunning of animals for slaughter.

U.S. Pat. No. 3,973,290 refers to stunning an animal for slaughter by applying microwave energy to penetrate the animal's skull and heat the brain. A microwave beam is proposed to be directed at the animal without restraining it, the energy being applied from the side of the skull. Such methods of application would create considerable surrounding tissue damage by largely indiscriminate heating and therefore would be an irreversible process, causing harm to the animal, and is likely to be inhumane.

U.S. Pat. No. 4,616,160 describes a microwave heating apparatus for irradiating the entire head of test animals, particularly rodents. The configuration of the apparatus including the manner of coupling the microwave energy to the animal will heat the entire head of the animal. The specification does not explain whether the purpose is to stun the animal but, if so, many organs and tissues of the head are likely to be damaged and the apparatus would therefore be unacceptable from the point of view of animal welfare.

DE 4116670 describes and illustrates an apparatus for irradiating a pig with multiple microwave applicators arranged around the head and in a row along the length of the spine, all being spaced from the animal. Use of such an apparatus design will irreversibly damage tissues by cooking affected tissues, which is likely to be inhumane.

JP 3039615 describes apparatus for slaughtering animals using microwaves to heat the brain causing cerebral death.

SUMMARY OF THE DISCLOSURE

Provided are processes and apparatus for stunning of animals to induce rapid unconsciousness and insensibility. Particularly provided are processes and apparatus for stunning of animals to induce rapid unconsciousness and insensibility in a manner that the stun is reversible, meaning that the animal can later regain consciousness and sensibility without significant loss of brain mediated function including motor functions, sensory processing, innate and instinctive functioning, learned behaviour, etc.

With such reversible animal stunning processes and apparatus, animals for slaughter can be stunned in a manner to enable subsequent processing and handling, including slaughter, whilst the system still remains compliant with certain religious slaughter rituals. The achievement of reversible stunning processes and apparatus may also enable such stunning of animals for other kinds of processing or handling, such as for veterinary inspections or purposes, banding, branding, tagging, inspection recording and re-release, etc. However, the particular processes and apparatus described herein will refer to the primary intended field of application, namely slaughtering of animals for food production, hide recovery and treatment, and other by-product extraction and processing.

In one aspect, provided is an animal stunning apparatus for inducing substantially immediate unconsciousness and insensibility enabling processing or handling of a subject animal, the apparatus including:

a stunning station to which a live subject animal to be processed or handled is introduced, the stunning station being arranged to locate the subject animal in a confined position, an applicator located so as to contact an application point on the live subject animal's head immediately overlying a frontal portion of the animal's brain, the applicator having a coupling conformation to couple microwave radiation therethrough to the head and to the frontal portion of the brain of the subject animal when in the confined position at the stunning station, a microwave generator for generating and radiating microwave energy of a suitable power level and frequency, and a waveguide coupled to the generator so as to receive and direct the microwave radiation to the applicator located at an operative end of the waveguide so as to thereby heat the frontal portion of the brain of the subject animal beneath the application point which the applicator contacts in use, and a switch operable so as to discontinue the application of microwave radiation effecting heating of the frontal portion of the brain after a period of time sufficient to have raised the temperature of the frontal portion of the brain of the subject animal to thereby induce the unconsciousness and insensibility, wherein the switch is operable to discontinue the application of microwave radiation immediately after a period which is sufficient only to rapidly induce insensibility, and insufficient
(i) for the insensibility induced to be irreversible, and
(ii) to cause significant heating of deeper brain tissues and including the brain stem.

Preferably, the application point is medially located on the head of the subject animal above a line extending between the animal's eyes so as to be located at the closest external point to the central and frontal portion of the brain.

An applicator may have an opening therein through which the microwave radiation from the waveguide is coupled to the animal's head at the application point, the peripheral portions of the applicator defining the opening contacting the animal's head to surround the application point when the applicator is in its operative position. The opening of the applicator preferably has an area chosen to provide impedance matching between the impedance of the applicator and the tissues at the application point, the area being bounded by the peripheral portions of the applicator which is composed of shielding material to provide power transfer to the animal tissues without microwave leakage. The peripheral portions of the applicator may be composed of shielding material and are configured to press into the surface tissues of the animal, typically by about 1-2 mm, to promote good coupling and microwave energy transfer without leakage and to resist transverse movement of the applicator if the animal attempts to move its head. By applying the peripheral portions of the applicator defining the opening so that they contact the animal's head surrounding the application point, good coupling of the microwave power from the waveguide through the applicator to the animal's head can be achieved and leakage and loss of microwave energy to the surroundings can be minimal, preventing tissue damage, and therefore more humane stunning may be achieved.

The applicator may have a coupling disk composed of microwave permeable material at the opening, the coupling disk being pressed positively against the animal head at the application point to provide an interface for transferring power at the application point. The coupling disk may be composed of a ceramic material to provide a robust interface for high power transfer. A further ceramic disk may be located in the microwave path of the applicator, the further disk being located upstream of the coupling disk a distance of ¼ of the wavelength of the microwave radiation so as to counteract negative affects of the ceramic coupling disk.

In one embodiment, the applicator comprises a coaxial applicator passing microwave radiation from the operative end of the waveguide to the application point, the coaxial applicator having a central conductor through the length of the applicator, the central conductor being coaxially located within a surrounding conductive sleeve thereby defining an annular microwave path from the waveguide to the coupling conformation. The coaxial applicator may include a conical section to concentrate the microwave energy from the waveguide upstream, the conical section having a gradual transition to the desired cross sectional area of the coupling conformation while maintaining acceptable power transfer therethrough. The microwave path through the coaxial applicator may be filled with a dielectric material so as to enable higher powered densities than air and to modify or tune the impedance.

The coaxial applicator may be connected to the operative end of the waveguide so as to extend therefrom at an angle to the general line of the waveguide, the connection between the operative end of the waveguide and the coaxial applicator being provided by a transition structure including a tapering cross section area to provide a gradual change in impedance from the waveguide and to provide matching of the impedance between the waveguide and the coaxial applicator and to limit or reduce reflected power losses.

The applicator may be constructed and arranged to apply the microwaves to the animal's head so that the electric field of the microwave energy enters the subject animal's head generally perpendicularly to penetrate the skin and skull at the application point and induce rapid heating of the frontal portion of the animal's brain.

In one embodiment, the generator is a TE type wave generator and the apparatus further includes a mode transformer operative to convert the TE type wave to a TM wave. Alternatively for greater power density the generated microwave radiation may comprise a TEM type wave whereby both the electric and magnetic fields enter the subject animal's head generally parallel to the skin surface at the application point.

To increase the rate of heating of the animal head and particularly of the frontal brain region, and thus decrease the duration of the heating time necessary to induce unconsciousness and insensibility, the apparatus preferably further includes an auto-tuner operatively associated with the waveguide and which detects the reflected power of microwave radiation in the waveguide resulting from the degree of the impedance matching between the applicator and the head and which tunes the waveguide to reduce the reflected power and increase the coupling of the microwave power to the head. The auto-tuner may be operated in an iterative manner to continually tune the waveguide during the application of microwave radiation so as to continually improve impedance matching while the impedance of the head changes due to heating.

In one embodiment, the apparatus further includes applicator moving means operative to selectively advance the applicator from a retracted position where it is located when the subject animal is being located in the confined position at the stunning station to an operative position when the animal is located and held in its confined position, the applicator in its operative position being engaged against the animal's head at the application point, the direction of the microwave radiation through the waveguide to the applicator being carried out only after the applicator is in its operative position. The applicator moving means may be operative to telescopically move the applicator from its inoperative position to its operative position contacting the animal head. A guiding system may be associated with the movable applicator for guiding movement of the applicator from its inoperative to its operative position, the guiding system including sensor means to sense the presence and location of the animal's head and to which the guiding system is responsive.

In another embodiment, the stunning station includes a head positioner to locate and present the subject animal's head in a defined position to the applicator. The head positioner may include a head lifter means to locate and lift the subject animal's head to the applicator which is in a predetermined position for the presentation of the animal's head thereto. This may comprise a head "tilter" to lift the animal's head by tilting it upwardly to present the application point to the applicator. The head tilter may comprise a chin lifting member to lift the chin or lower jaw of the animal upwardly and tilt the head backwardly to present the application to the applicator.

In this embodiment, the head positioner may further include a head tilt limiter towards which and into contact with which the head lift means tilts the animal head, the tilt limiter typically comprising a fixed abutment contacted by the top back portion of a animal's head when the head has been lifted and tilted sufficiently to present the application point to the applicator. Furthermore the head positioner may include a neck lifter selectively operable to raise the animal's head (without necessarily tilting of the head) by lifting force applied from beneath to the neck of the animal, thereby raising the head towards the applicator particularly enabling different height animals to be processed.

In one possible apparatus, the head positioner includes a body lifter selectively operable to raise the animal's body (without necessarily separately lifting or tilting of the head or lifting the neck) by lifting force applied from beneath to the body of the animal, thereby raising the head towards the applicator particularly enabling different height animals to be processed. In a further possible apparatus, the stunning station includes a body support for the animal support the animal during the application of the microwave energy in case the animal slumps or falls at the onset of insensibility.

Preferably the stunning station includes microwave shielding surrounding at least the position of the animal head when the animal is confined thereby forming a Faraday cage, the shielding having an opening in which the animal's head is located.

Also provided is a method of stunning an animal for inducing substantially immediate unconsciousness and insensibility enabling processing or handling of the animal, the method including the steps of:

introducing a live subject animal to be processed or handled to a stunning station and locating the animal in a generally confined position, locating an applicator in contact with an application point on the animal's head immediately overlying the frontal portion of the subject animal's brain, the applicator having a coupling conformation to couple microwave radiation through the applicator to the head and to the frontal portion of the brain of the subject animal, generating microwave radiation of a suitable power level and frequency and directing that radiation through a waveguide to the applicator at an operative end of the waveguide to thereby heat the frontal portion of the brain of the subject animal, wherein the application of the microwave radiation to effect the heating is continued for a period of time to raise the temperature of the frontal portion of the brain, the period being sufficient only to rapidly induce insensibility, and insufficient (i) for the insensibility induced to be irreversible, and (ii) to cause significant heating of deeper brain tissues and including the brain stem.

In one possible embodiment, the microwave radiation generated has its electric field generally perpendicular to the front of the animal's head at the application point whereby the electric field enters the animal's head in a generally perpendicular direction. In an alternative possible embodiment, the microwave radiation generated has both its electric field and magnetic field generally parallel to the front of the animal's head at the application point and whereby the microwave radiation enters the animal head in the generally perpendicular direction.

Preferably, the frontal portion of the brain of the subject animal is heated so as to increase the temperature by an amount in the range of about 5° C. to about 10° C., and most preferably the frontal portion of the brain of the subject animal is heated to a temperature of about 43° C.

Also provided is a method of handling and processing an animal, the method including the steps of:

stunning the animal to rapidly induce unconsciousness and insensibility enabling processing or handling of the animal, the stunning step including:

introducing a live subject animal to be handled and processed to a stunning station and locating the animal in a generally confined position, locating an applicator in contact with an application point on the animal's head immediately overlying the frontal portion of the subject animal's brain, the applicator having a coupling conformation to couple microwave radiation through the applicator to the head and to the frontal portion of the brain of the subject animal, generating microwave radiation of a suitable power level and frequency and directing that radiation through a waveguide to the applicator at an operative end of the waveguide to thereby heat the frontal portion of the brain of the subject animal, wherein the application of the microwave radiation to effect the heating is continued for a period of time to raise the temperature of the frontal portion of the brain, the period being sufficient only to rapidly induce insensibility, and insufficient (i) for the insensibility induced to be irreversible, and (ii) to cause significant heating of deeper brain tissues and including the brain stem;

performing on the animal in the unconscious and insensible state a process selected from general purpose inspection, general purpose treatment, veterinary inspection, veterinary treatment, docking, tagging, and branding; and subsequent to the step of performing the selected process, reviving the animal by returning the temperature of the frontal part of the brain towards its normal operating temperature so that the animal regains consciousness and sensibility without significant loss of brain mediated function.

Also provided is a method of stunning and subsequently slaughtering an animal, the method including the steps of:

stunning the animal for rapidly inducing unconsciousness and insensibility, the stunning step including:

introducing a live subject animal to be slaughtered to a stunning station and locating the animal in a generally confined position, locating an applicator in contact with an application point on the animal's head immediately overlying the frontal portion of the subject animal's brain, the applicator having a coupling conformation to couple microwave radiation through the applicator to the head and to the frontal portion of the brain of the subject animal, generating microwave radiation of a suitable power level and frequency and directing that radiation through a waveguide to the applicator at an operative end of the waveguide to thereby heat the frontal portion of the brain of the subject animal, wherein the application of the microwave radiation to effect the heating is continued for a period of time to raise the temperature of the frontal portion of the brain, the period being sufficient only to rapidly induce insensibility, and insufficient (i) for the insensibility induced to be irreversible, and (ii) to cause significant heating of deeper brain tissues and including the brain stem; and while the animal is in the unconscious and insensible state, slaughtering the animal in a manner compliant with religious ritual slaughter criteria prescribed for Muslim "Halal" slaughter or for Judaic "Shechita" slaughter.

Also provided is an animal stunning apparatus for rapidly inducing unconsciousness and insensibility enabling processing or handling of a subject animal, the apparatus including:

a stunning station to which a live subject animal to be processed or handled is introduced, the stunning station being arranged to locate the subject animal in a confined position, the stunning station including head positioning means to locate and present the subject animal's head in a defined position;

an applicator located relative to the subject animal's head when in its defined position so as to contact an application point on the live subject animal's head immediately overlying a frontal portion of the animal's brain, the application point being medially located on the head of the subject animal above a line extending between the animal's eyes so as to be located at the closest external point to the central and frontal portion of the brain, the applicator having a coupling conformation to couple microwave radiation therethrough to the head and to the frontal portion of the brain of the subject animal when in the confined position at the stunning station, the applicator having an opening therein through which the microwave radiation from the waveguide is coupled to the animal's head at the application point, the peripheral portions of the applicator defining the opening contacting the animal's head to surround the application point when the applicator is in its operative position;

a microwave generator for generating and radiating microwave energy of a suitable power level and frequency, and a waveguide coupled to the generator so as to receive and direct the microwave radiation to the applicator located at an operative end of the waveguide so as to thereby heat the frontal portion of the brain of the subject animal beneath the application point which the applicator contacts in use, stunning station including microwave shielding surrounding at least the position of the animal head when the animal is in its confined position thereby forming a Faraday cage, the shielding having an opening in which the animal's head is located; and switching means operable so as to discontinue the application of microwave radiation effecting heating of the frontal portion of the brain after a period of time sufficient to have raised the temperature of the frontal portion of the brain of the subject animal to thereby induce the unconsciousness and insensibility.

BRIEF DESCRIPTION OF THE DRAWINGS

Possible and preferred features of the invention will now be described with particular reference to the accompanying drawings. However it is to be understood that the features illustrated in and described with reference to the drawings are not to be construed as limiting on the scope of the invention. In the drawings.

DETAILED DESCRIPTION

Figure 2:
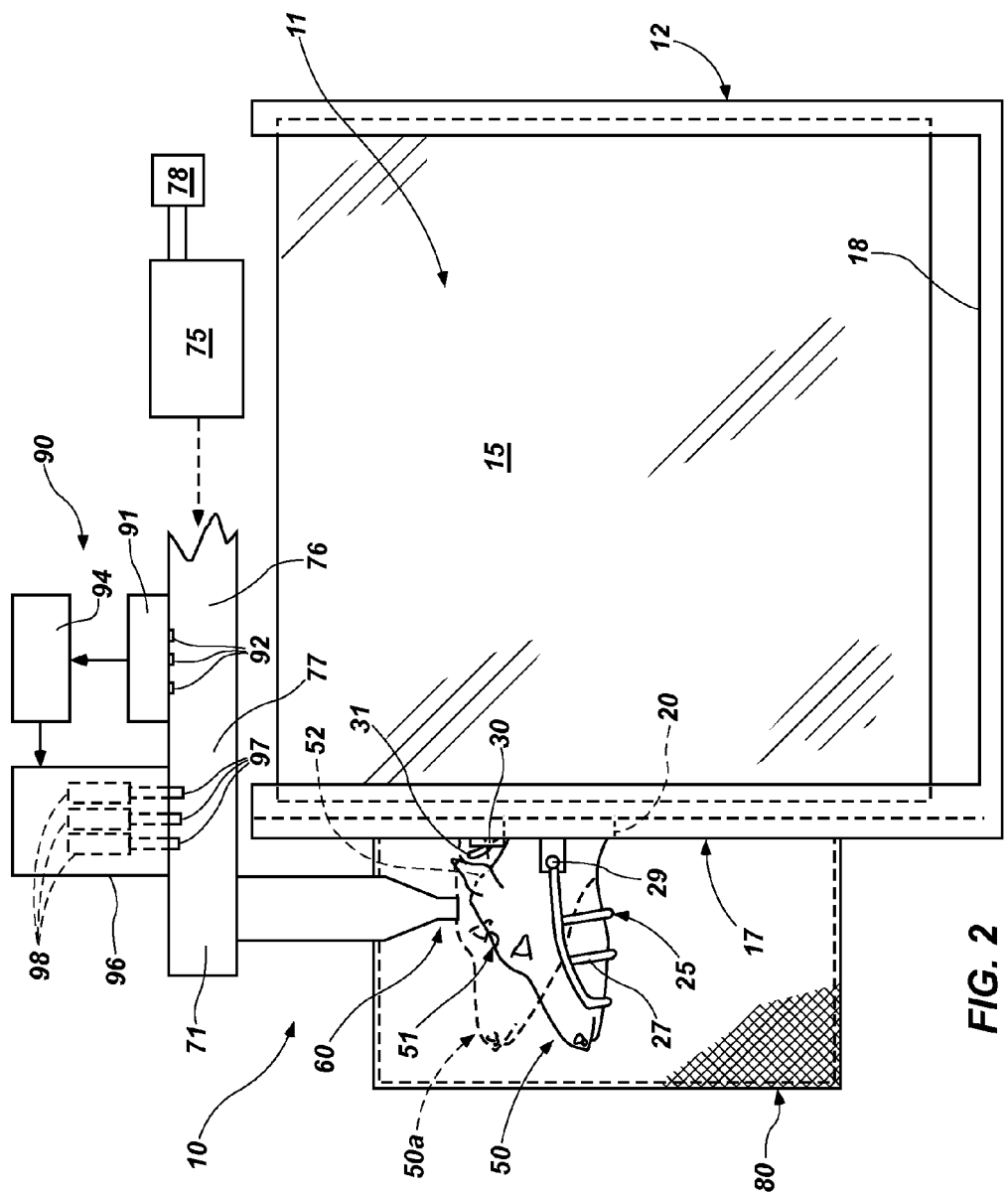
FIG. 2 schematically illustrates in side view an animal stunning station with stunning apparatus according to one embodiment of the invention.
Figure 3:
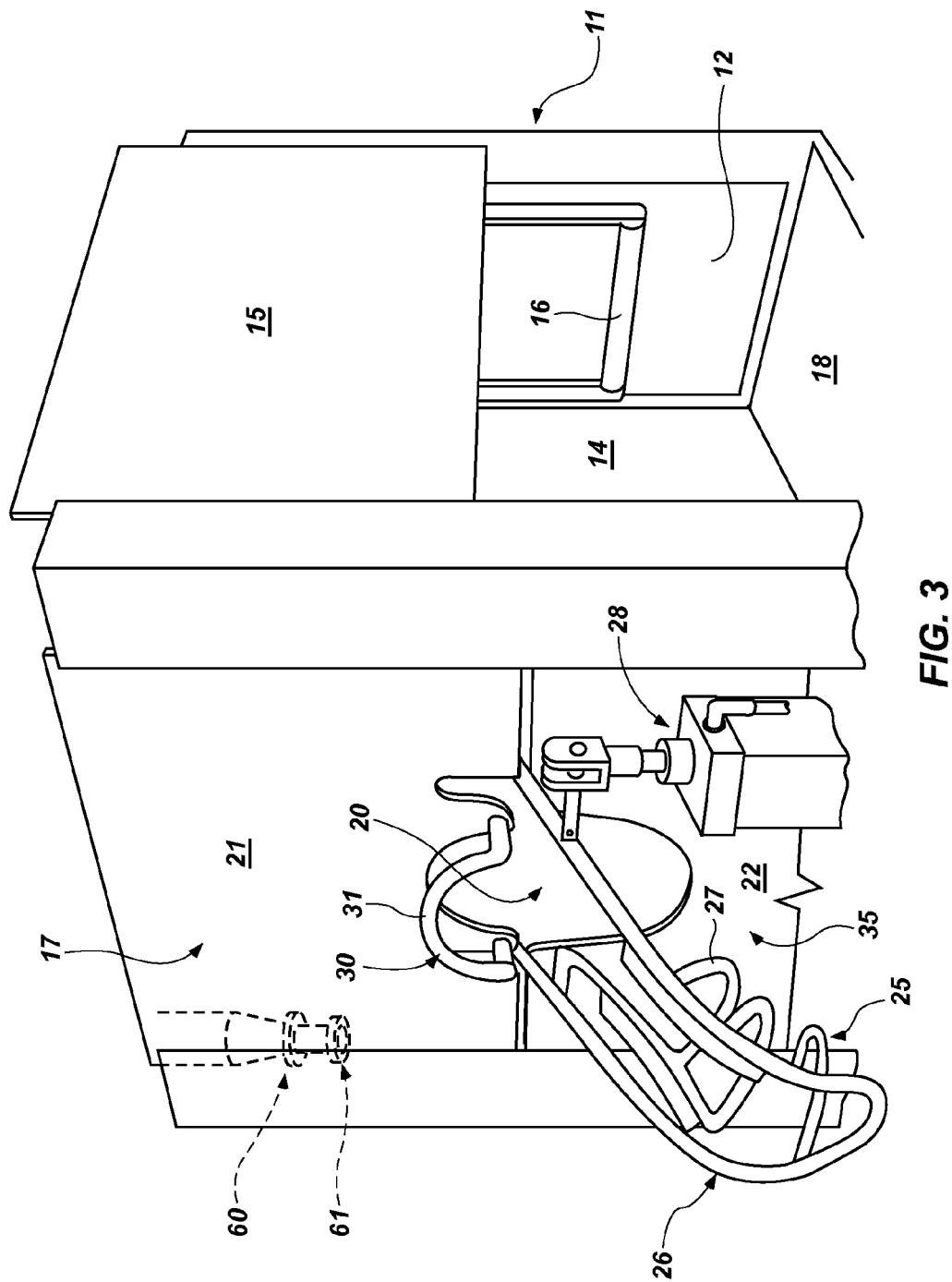
FIG. 3 is a perspective view of parts of an animal stunning station and a possible head positioning means.

The illustrated apparatus of FIGS. 2 and 3 includes an animal stunning station 10 which includes an enclosure 11 or crush, such as a knocking box of an abattoir. Although the drawings and associated description relate to a fixed position of stunning station, it is to understood that the stunning station can be itself moving, e.g., along a conveyor, and the expression in the specification and claims includes such a moving stunning station. The animal is introduced into the enclosure through entrance 12 and confined therein between the entrance 12, which has a door which closes behind the animal, side walls 14,15 and head end 17. Side wall 15 is shown closed in FIG. 2 but can be selectively raised as shown in FIG. 3 to enable side discharge of the carcase after stunning. The floor 18 is shown slightly sloping to the side to promote the sideways discharge. A pusher 16, initially retracted when the animal enters the enclosure 11 through the entrance 12, can be located behind the animal and then moved towards the head end 17 so as to urge the animal to present its head as required. An opening 20 at the head end 17 of the enclosure 11 enables the animal to place its head 50 through the opening which it will naturally do to look for an exit and which, in an automated system, can be encouraged the pusher 16 or by conveying the animal on a moving floor or conveyor system 18 into the knocking box. The opening 20 is initially substantially larger than shown in FIGS. 2 and 3 by providing vertically movable upper and lower panels 21, 22 which are relatively moved apart to enable the animal to insert its head through the opening 20 defined by the shaped lower and upper edges of the panels 21, 22 respectively. When the head 50 has passed through the opening 20, the panels 21, 22 are immediately moved to confine the neck of the animal and prevent it retracting its head 50 back through the opening 20. If desired laterally movable head or neck bails, e.g., closely adjacent to and either inside or outside of the head end wall 17 (known in the art) can laterally confine the head and/or neck.

Figure 1:
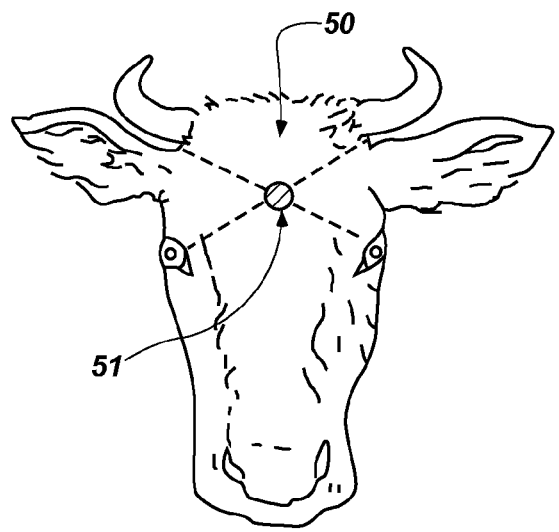
FIG. 1 is an illustration of a cattle head with the application point for the microwave radiation indicated.

In the embodiment of FIGS. 2 and 3, the stunning station 10 includes head positioning means 25 to locate and present the animal's head 50 in a defined position to the microwave applicator 60. The head positioning means 25 includes a head lifter means 26 to locate and lift the head 50 to the applicator 60 which is in a predetermined position for the presentation of the head 50 thereto. The head positioning means is illustrated as a head tilting mechanism to lift the animal's head 50 as shown at 50a in FIG. 2. The applicator point 51 where the microwave radiation is to be applied by the applicator 60 is, as shown in FIG. 1, medially located on the head above a line extending between the animal's eyes so as to be located at the external point closest to the central frontal portion of the brain. In the case of cattle, the application point 51 can be located substantially medially at the recommended point where percussion is applied in the present known mechanical stunning processes, whether using a captive bolt stunning apparatus or using a non-penetrating impacting tool. As shown in FIG. 2, when the head is lifted by tilting to the position 50a, the application point 51 is presented to the applicator 60.

The head tilting means 26 comprises a chin lifting member shown as a frame or cradle 27 which generally conforms to the shape of the jaw and which is operated to lift the chin or lower jaw of the animal upwardly and tilt the head 50 backwardly to present the application point 51 to the applicator 60.

The chin lifting frame or cradle 27 may include restraints mounted at each side and shaped and positioned to locate behind the cheek bones and further inhibit or prevent the animal pulling its head 50 backwardly once it has been engaged and is being positioned. The lifting of the animal's head 50 is by pneumatic ram 28 which pivots the frame or cradle 27 upwardly about pivot axis 29 (schematically shown in FIG. 2 in front of the end 17, but behind end 17 in FIG. 3).

The head positioning means 25 further includes a head tilt limiter 30 towards which and into contact with which the head lift means 26 tilts the animal head 50. The tilt limiter 30 is shown as a fixed abutment 31 contacted by the top back portion 52 or "poll" of the animal's head 50 when the head has been lifted and tilted sufficiently to present the application point 51 to the applicator 60. The tilt limiter 30 can be differently shaped, sized, and positioned and can if desired be selectively movable to accommodate different sizes and breeds of animal etc. so that the application point 51 is reliably and accurately presented to the applicator 60.

In the embodiment of FIG. 3, the selectively vertically movable lower panel 22 of the head end wall 17 constitutes a neck lifting means 35 because it is operable to raise the animal's head 50 by lifting force applied from beneath the neck of the animal thereby raising the head 50 towards the applicator 60 and enabling for example different height animals to be processed.

The head positioning means 25 may also include a body lifting means selectively operable to raise the animal's body (without necessarily separately lifting or tilting of the head or lifting of the neck) by lifting force applied from beneath the body of the animal, thereby raising the head 50 towards the applicator 60 particularly to enable different height animals to be processed. For example, the body lifting means may comprise means to selectively raise and lower the floor 18 of the enclosure 11. Alternatively, the entire enclosure 11 may be raised to present the animal head 50 to applicator 60.

In a further possibility, the stunning station 10 may include a body support for the animal operative to support the animal during the application of the microwave energy in the event that the animal starts to slump or fall at the onset of insensibility. For example, the walls 14, 15 may be relatively selectively movable towards each other to act as a crush which closely confines and supports the animal body. E.g., the wall or walls 14, 15 may slope inwardly towards their bottom edges. Alternatively, or in addition, a selectively retractable support may be inserted to fit beneath the brisket and provide support for the thorax if the animal starts to fall or slump after the application of microwave energy commences but before the end of the energy application period.

Figure 4:
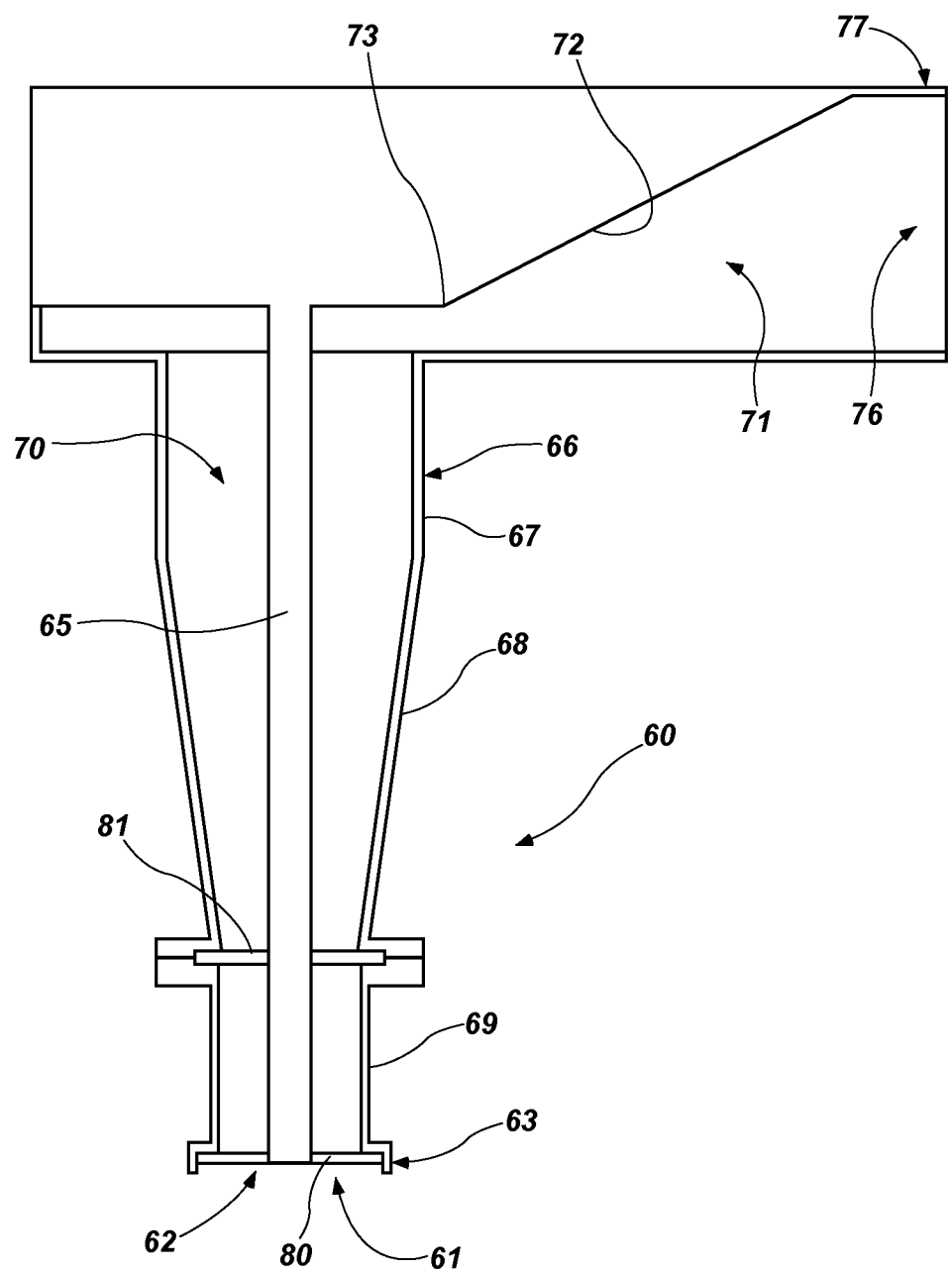
FIG. 4 is a cross sectional view of a terminal end portion of the waveguide leading to the applicator.

The stunning station in the illustrated apparatus of FIGS. 2 to 4 locates the animal in the confined position so that the applicator 60 can contact the application point 51 immediately overlying a frontal portion of the animal's brain. The applicator 60 has a coupling conformation 61 to couple microwave radiation therethrough to the head 50 and of the animal A microwave generator 75 generates and radiates microwave energy of a suitable power level and frequency. Waveguide 76 is coupled to the generator so as to receive and direct the microwave radiation to the applicator 60 located at an operative end 77 of the waveguide. Switching means 78 is operable so as to discontinue the application of microwave radiation effecting the heating of the frontal portion of the brain after a period of time sufficient to raise the temperature of the frontal portion of the brain of the animal to thereby induce unconsciousness and insensibility.

If the animal is to be stunned for ritual slaughter requiring the animal to be live, the switching means 78 is operable to discontinue the application of microwave radiation immediately after a period which is:
 sufficient only to rapidly induce insensibility and insufficient
 (i) for the insensibility induced to be irreversible, and
 (ii) to cause significant heating of the brain tissues and including the brain stem.

Such timing of the application of radiation may also be applicable if the animal is to be held insensible for a time, e.g., for performing veterinary tests or processes, after which the animal is to be returned to its normal sensible and conscious condition by allowing the temperature of the front portion of the brain to return to normal. In this situation, if the animal is to be held insensible for a period of time, the application of microwave radiation may be pulsed or intermittent so as to maintain the insensible state.

FIG. 2 schematically illustrates the waveguide 76 provided with an associated auto-tuner 90 so as to improve the tuning efficiency and effectiveness between different animals being processed and to enable adjustment of the tuning as the dielectric properties of the animal heads change with temperature. As each animal head has a slightly different impedance, tuning of the impedance of the waveguide and applicator to each animal head as it is presented is beneficial.

The auto-tuner 90 in FIG. 2 includes a directional coupler 91 mounted to and operatively associated with the waveguide 76. For example the coupler samples the standing wave in the waveguide, eg. by providing probes 92 at spaced points lengthwise of the waveguide, optimally at 60° intervals of the guide wavelength. The coupler 91 provides data signals to the processor 94 which can be a PC programmed to analyse the signals from the coupler 91 and to determine forward and reflected power levels. A target reflected power level may be programmed for the apparatus to achieve by tuning of the waveguide. Effectively the coupler 91 and associated processor 94 are determining the impedance by determining the reflection co-efficient of the microwave load (i.e., the head 50.

The apparatus also includes a tuner 96 associated with the waveguide 76 and which is responsive to the processor 94. The tuner may for example comprise moveable members 97 having associated drives 98 so that, in response to command signals from the processor 94, the drives 98 move the respective positions of the members 97 within the waveguide 76, thereby altering the impedance characteristics. The direction and extent of the movements of the members 97 are controlled by the processor so as to adjust the reflected power towards the programmed target and thereby improve the coupling of the microwaves to the head 50.

Each animal head 50 has a slightly different impedance, eg. due to differences in the sizes and composition of the heads, and due to the positions of the heads in relation to the applicator 60. As soon as power is applied, the auto-tuner 90 begins analysing the impedance and adjusting the tuner 96 so as to improve the impedance matching between the waveguide 76 and applicator 60 and head 50. As the application of microwave radiation to the head 50 occurs and warming of the head and frontal brain tissues begins, the impedance of the head 50 will change. Therefore the auto-tuner 90 is operative to continually monitor the reflected power and to automatically adjust the tuner 96 and maintain or improve the power coupling to the head 50. Thus by automatically impedance matching between the waveguide and applicator and the head at the commencement of the stunning operation, and by continually monitoring and auto-tuning of the waveguide in an iterative manner to maintain impedance matching, the rate of heating of the animal head 50 and particularly of the frontal brain region can be increase, thus decreasing the duration of the heating time necessary to induce unconsciousness and insensibility.

Auto-tuners suitable for use in the apparatus of the invention may be composed of a "Homer Analyzer" (an automatic impedance and power measurement system) from S-TEAM Lab, Slovak Republic, which is operatively coupled to a motorised tuner such as one obtained from, or analogous to those made by, Muegge GmbH (Reichelsheim, Germany).

Referring particularly to FIG. 4, the applicator 60 has an opening 62 through which the microwave radiation from the waveguide 76 is coupled to the animal's head 50 at the application point 51. The peripheral portions 63 of the applicator defining the opening 62 contact the animal's head so as to surround the application point 51 when the applicator 60 is in its operative position. The area of the opening 62 is chosen to provide impedance matching between the impedance of the applicator 60 and the tissues at the application point 51. The area bounded by the peripheral portions 63 are composed of shielding material, typically metal, to provide power transfer to the animal tissues without microwave leakage. As shown in FIG. 4, the peripheral portions 63 composed of shielding material are configured so as to project slightly beyond the opening 62 so that they press into the surface tissues of the animal, typically by about 1-2 mm, to promote good coupling and microwave energy transfer without leakage and also to resist transverse movement of the applicator 60 if the animal attempts to move its head particularly generally in the plane of the opening 62.

The applicator 60 shown in FIG. 4 comprises a co-axial applicator passing microwave radiation from the operative end 77 of the waveguide 76 to the application point 51. The co-axial applicator has a central conductor 65 through the length of the applicator and which is co-axially located within a surrounding conductive sleeve 66 and thereby defining an annular microwave path 70 from the wave guide 76 to the coupling conformation 61. The co-axial applicator includes a conical section 68 of the sleeve 66 to concentrate the microwave energy from the waveguide upstream, the conical section 68 has a gradual transition to the desired cross-sectional area of the coupling conformation 61 while maintaining acceptable power transfer therethrough. The microwave path 70 through the co-axial applicator is filled with a dielectric material so as to enable higher powered densities and to modify or tune the impedance. A suitable dielectric material may be PTFE or polyethylene that has a small loss tangent, i.e., much less than 1.0, to enable the use of smaller dimensions of the applicator.

The co-axial applicator 60 in FIG. 4 is connected to the operative end 77 of the waveguide 76 so as to extend therefrom at an angle (shown as 90°) to the general line of the waveguide 76. The connection between the operative end of the waveguide 77 and the co-axial applicator 60 is provided by a transition structure 71 which includes a tapering cross-section area formed by the taper or ramp 72 to provide a gradual change in impedance from the waveguide 76 and to provide matching of the impedance between the waveguide 76 and the co-axial applicator 60 and limit or reduce reflected power losses. The taper 72 and ridge 73 function as part of the waveguide to co-axial applicator transition and provide a way of matching the waveguide impedance with the co-axial applicator impedance. The dimensions of the taper 72 and of the transition structure 71 are determined based on the required impedance of the co-axial applicator 60.

The centreline of the central conductor 65 and therefore of the co-axial applicator 60 is located for maximum power coupling from the waveguide to the applicator. This is typically where the distance from the short circuit waveguide back wall to the centreline is one quarter or three quarter the wavelength. The dimensions of the central conductor 65 remain constant in cross-section and that dimension is selected with the entire dimensions of the co-axial applicator 60 in mind. The internal and external conductor dimensions are chosen based on the desired impedance of the co-axial applicator 60 and its ability to handle high power without voltage breakdown. The dimensions of the final section of the co-axial applicator provided by the sleeve portion 69 leading to the opening 62 are designed and dimensioned to match with the impedance of the animal's skin thus ensuring maximum power transfer. Another consideration is to reduce the cross-sectional area of the opening 62 to as small as practical so that high power density can be delivered.

The applicator 60 in FIG. 4 has the coupling disc 80 composed of microwave permeable material at the opening 62. The coupling disc 80 is pressed positively against the animal head at the application point 51 to provide an interface for transferring power. The coupling disc 80 can be composed of a ceramic material to provide a robust interface for high power transfer. A further ceramic disc 81 is provided in the microwave path of the applicator 60, the further disc 81 being upstream of the coupling disc 80, preferably a distance of one quarter of the wavelength of the microwave radiation, so as to counteract negative effects of the ceramic coupling disc 80.

As shown in FIG. 2, the stunning station 10 includes a microwave shielding surrounding at least the position of the animal head 50 when the animal is in its confined position. The shielding 80 forms a Faraday cage for limiting or preventing leakage of microwave radiation. The animal's head 50 in use extends through the opening 20 which constitutes an opening into the Faraday cage. The head end 17, particularly the panels 21, 22 effectively form part of the Faraday cage.

Figure 5:
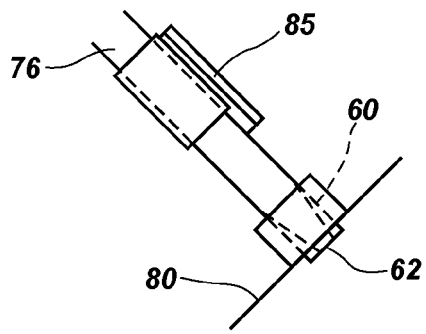
FIGS. 5 and 6 are schematic side views of an alternative configuration of applicator shown in its retracted inoperative and advanced operative positions respectively.
Figure 6:
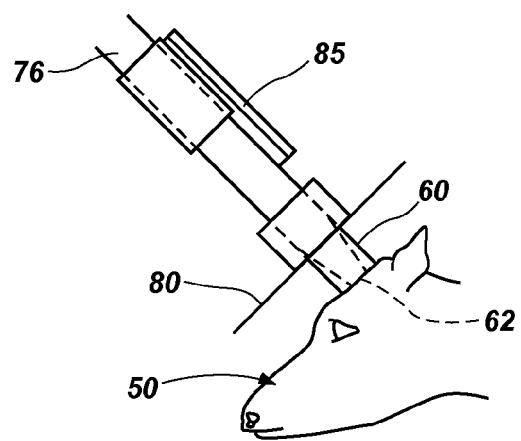

In the alternative possible construction of applicator 60 shown in FIGS. 5 and 6, there is provided applicator moving means 85 operative to selectively advance the applicator 60 from a retracted position shown in FIG. 5 where it is located when the animal is being located in the confined position at the stunning station 10 to an operative position shown in FIG. 6 when the animal is located and held in its confined position. The applicator 60 in its operative position in FIG. 6 engages against the animal's head 50 at the application point 51 and the passing of the microwave radiation through the waveguide 76 to the applicator being carried out only after the applicator 60 is in its operative position. As shown in FIGS. 5 and 6, the applicator moving means 85 is operative to telescopically move the applicator 60 from its inoperative position to its operative position contacting the animal's head.

The apparatus may include a guiding system (not shown) associated with the movable applicator 60 for guiding movement of the applicator from its inoperative to its operative position, the guiding system including sensor means such as micro switches, proximity sensors, head image capture means and head shape recognition software, etc to sense and determine the presence and location of the animal's head and to which the guiding system is responsive to accurately place the opening 62 of the applicator 60.

In the arrangement in FIGS. 2 to 4, the radiation forms an angle of incidence with the animal head at the application point 51 of about 90°, i.e., generally orthogonal to the flat portion of the animal skull above the line joining the eyes and immediately over the frontal portion of the brain. The generated microwave radiation preferably comprises a TEM (transverse electromagnetic) type wave whereby both the electric and magnetic fields enter the animal head 50 generally parallel to the skin surface. The use of TEM type waves enables higher power transfer through the animal tissues for fast heating.

In an alternative possibility, the microwave radiation generated has its electric field generally perpendicular to the front of the animal's head 50 at the application point 51 whereby the electric field enters the animal's head in a generally perpendicular direction. Known apparatus for microwave heating, such as in industrial processes in which microwaves are used to heat food for cooking purposes, utilise microwave radiation generated in a "transverse electric" or "TE" mode, meaning that the propagating field has the electric field transverse to the direction of propagation along the waveguide. However, the present apparatus may convert a TE type wave to a "transverse magnetic" or "TM" wave in which the electric field is parallel to the propagation direction so as to enter the animal's head at the application point generally perpendicular to the surface of the animal's head at that point. TM waves have a lower wave impedance than TE waves: Z=E/H, so that a TM wave will have a lower electric field strength for a particular power setting but it is the electric field strength than can cause arcing and skin heating favouring a TM wave. Also, it is believed that thin material, such as skin, couples energy better when the electric field is parallel to the surface of the material so that, in the present preferred apparatus, our aim is to achieve the opposite, namely weaken the coupling of energy at the surface skin or hide layer. In this possible embodiment, therefore, risk of discomfort or pain to the animal may be reduced by the application of the TM type microwave energy at the application point. Preferably where the generator is a TE type wave generator, the apparatus further includes a mode transformer operative to convert the TE type wave to a TM wave. The mode transformer may be located in series between the waveguide feed from the generator and the applicator.

In this possible embodiment, the applicator has a conformation to apply the TM wave to the animal's head so that the electric field of the microwave energy enters the subject animal's head generally perpendicularly to penetrate the skin and skull at the application point to induce heating of the frontal portion of the animal's brain.

The apparatus may also include an automatic timer control (not shown) to start and terminate the application of microwave radiation to the animal head depending on programmed criteria. For example, the knocking box may include an animal weight sensor, the output of which is fed to the timer control which determines the necessary period for the application of microwave radiation according to an algorithm or formula.

The microwave generator may be generally conventional in construction and operation. The frequency of the microwave radiation generated and transmitted through the associated waveguide may be any suitable value. Tests involving the application of microwave radiation to cattle and sheep heads have utilised microwave generators operating at frequencies commercially utilised in Australia, namely 922 MHz and 2.45 GHz. These tests demonstrated that with the lower frequency 922 MHz there is better penetration of the energy and less unwanted heating of tissues at the surface and in surrounding tissues, so such a lower frequency is preferred. However, the optimum frequency or frequency range can be determined empirically and is believed to be in the range 500 MHz-1 GHz.

The power requirements of the microwave generator will be dependent on many factors including, for example, the type of animal to be stunned including species (sheep, cattle, pigs, etc)

the breed of the particular animal species (Hereford, Brahman, etc)

the age, body mass, and sex of the animal the speed required to achieve effective stunning to induce unconsciousness and insensibility, the temperature rise required within the frontal portion of the animal's brain necessary to induce the unconsciousness and insensibility whether TE mode, TM mode or TEM mode microwave radiation is being generated and applied to achieve the frontal brain heating.

Such factors are not necessarily entirely independent of each other.

For example, tests on sheep and cattle heads have produced data indicative of the power requirements being:

for sheep, to induce a 10° C. temperature rise of the frontal portion of the brain, in about one second: 40 kW power output.

for cattle (about 300 kg body weight), 10° C. temperature rise of the frontal portion of the brain, within 1.5 seconds: 100 kW power output.

These findings are indicative only because, as explained above, there are many parameters affecting the power requirement to achieve a certain level of heating within a target time period commencing with switching on of the microwave radiation. Therefore, the power requirements for the generator can be empirically determined Preferably the temperature rise of the frontal portion of the brain to induce reversible unconsciousness and insensibility is in the range of about 5° C. to less than about 10° C. For example, tests with live (anaesthetised) sheep showed frontal brain heating to about 43° C. produced electroencephalogram (EEG) traces similar to those observed with electric stunning now widely used in abattoirs, thus indicating that that temperature would achieve unconsciousness and insensibility. However heating to about 50° C. or more would start to produce protein denaturation and hence permanent tissue damage.

Upon the application of the microwave energy and achievement of the required degree of heating, the generation of microwave energy is preferably switched off (or otherwise stopped from application to the animal) so as to prevent further heating which would make the stun irreversible. Also the discontinuance of the application of microwave energy limits or prevents heating of deeper tissues, particularly the brain stem, to any significant extent, particularly heating to cause irreversible effects. In particular, heating of the mid and deep brain tissues and particularly the brain stem area (which controls cardiac and respiratory functions) to the same extent as the frontal portion is undesirable, because it may cause immediate effects, such as heart failure which may then lead to the stun and subsequent slaughter being deemed non-compliant with the religious ritual slaughter criteria, the animal carcase being rejected as unacceptable for the intended consumption by the relevant religious group, with consequent devaluation of the carcase and its meat. In the case of sheep, brain stem heating should be limited to maintain the brain stem temperature to less than about 43° C.

The time period required for application of the microwave energy is preferably as short as possible although achieving shorter times entails greater microwave generator power output so there is a necessary balancing of these two parameters. However, preferably stunning to achieve the unconsciousness and insensibility in less than about 2 seconds is preferred to meet reasonable animal welfare considerations (minimising fear, anxiety, pain, suffering, and distress in the animal).

Particularly preferred would be achieving the effective stun in less than about one second and most preferably achieving this in about 0.5 seconds.

Confinement of the major heating effect to the frontal portion of the animal brain in the process and apparatus of the invention is required to render the induced insensibility reversible. The frontal portion of the brain is involved in cognitive, perception, sensory, and consciousness brain functioning or processes so that warming of this portion of the brain by the extent indicated leads to unconsciousness and insensibility but without causing irreversible damage to the brain tissues and brain functioning if the elevated temperature does not exceed 50° C.

However although particularly developed and described herein in relation to reversible stunning for ritual slaughter, the apparatus and method may be useful for other processes requiring reversible insensibility. Examples may include veterinary procedures in which temporary insensibility is required or useful. To avoid the animal regaining consciousness the microwave radiation may be applied in pulses or intermittently to maintain unconsciousness without permanent damage or other undesired effects. Analogously the apparatus and method may be useful for other animal processes or treatments or inspections, e.g., docking, tagging, branding, and inspections generally.

Because the stunning using the apparatus and process can produce insensibility or unconsciousness in a manner without excessive stress and pain, the invention can be extended for use as a permanent or irreversible stunning or killing system. By increasing the power or duration of the application of microwaves, the increased heating effect and/or deeper brain heating can enable a useful alternative to current irreversible electrical or percussive stunning of animals for slaughter.

It will be seen that the process and apparatus according to the preferred embodiments described herein, including those described in relation to the drawings, can enable stunning of animals, particularly animals for slaughter, so as to rapidly induce unconsciousness and insensibility enabling further processing or handling, including slaughter in a manner compliant with religious ritual criteria or handling for temporary, m such as veterinary, processes because the stun is reversible. The stun also is carried out in a way that complies with good animal welfare handling practices. Indeed, the present inventive method and apparatus are potentially capable of being better than current practices, particularly relating to animal welfare outcomes. For example success rates for rapid and reliable stunning may be better, there may be less risk of operator error, and there may be less stress to animals.

What is claimed is:

1. An animal stunning apparatus for inducing substantially immediate unconsciousness and insensibility enabling processing or handling of a subject animal, the apparatus including:

a stunning station to which a live subject animal to be processed or handled is introduced, the stunning station being arranged to locate a subject animal in a confined position, an applicator located so as to contact an application point on the live subject animal's head immediately overlying a frontal portion of the animal's brain, the applicator having a coupling conformation to couple microwave radiation therethrough to the head and to the frontal portion of the brain of the subject animal when in the confined position at the stunning station, a microwave generator for generating and radiating microwave energy of a suitable power level and frequency, and a waveguide coupled to the generator so as to receive and direct the microwave radiation to the applicator located at an operative end of the waveguide so as to thereby heat the frontal portion of the brain of the subject animal beneath the application point which the applicator contacts in use, and a switch operable so as to discontinue the application of microwave radiation effecting heating of the frontal portion of the brain after a period of time sufficient to have raised the temperature of the frontal portion of the brain of the subject animal to thereby induce the unconsciousness and insensibility, wherein the switch is operable to discontinue the application of microwave radiation immediately after a period which is sufficient only to rapidly induce insensibility, and insufficient (i) for the insensibility induced to be irreversible, and (ii) to cause significant heating of deeper brain tissues and including the brain stem.

2. The apparatus of claim 1, wherein the applicator has an opening therein through which the microwave radiation from the waveguide is coupled to the animal's head at the application point, the peripheral portions of the applicator defining the opening contacting the animal's head to surround the application point when the applicator is in its operative position.

3. The apparatus of claim 2, wherein the applicator has a coupling disk composed of microwave permeable material at the opening, the coupling disk being pressed positively against the animal head at the application point to provide an interface for transferring power at the application point.

4. The apparatus of claim 1, wherein the applicator comprises a coaxial applicator passing microwave radiation from the operative end of the waveguide to the application point, the coaxial applicator having a central conductor through the length of the applicator, the central conductor being coaxially located within a surrounding conductive sleeve thereby defining an annular microwave path from the waveguide to the coupling conformation.

5. The apparatus of claim 4, wherein the microwave path through the coaxial applicator is filled with a dielectric material so as to enable higher powered densities than air and to modify or tune the impedance.

6. The apparatus of claim 4, wherein the coaxial applicator is connected to the operative end of the waveguide so as to extend therefrom at an angle to the general line of the waveguide, the connection between the operative end of the waveguide and the coaxial applicator being provided by a transition structure including a tapering cross section area to provide a gradual change in impedance from the waveguide and to provide matching of the impedance between the waveguide and the coaxial applicator and to limit or reduce reflected power losses.

7. The apparatus of claim 1, wherein the applicator is constructed and arranged to apply the microwaves to the animal's head so that the electric field of the microwave energy enters the subject animal's head generally perpendicularly to penetrate the skin and skull at the application point and induce rapid heating of the frontal portion of the animal's brain.

8. The apparatus of claim 1, wherein the generated microwave radiation comprises a TEM type wave whereby both the electric and magnetic fields enter the subject animal's head generally parallel to the skin surface at the application point.

9. The apparatus of claim 1, and further including an autotuner operatively associated with the waveguide and which detects the reflected power of microwave radiation in the waveguide resulting from the degree of the impedance matching between the applicator and the head and which tunes the waveguide to reduce the reflected power and increase the coupling of the microwave power to the head.

10. The apparatus of claim 9, wherein the auto-tuner is operated in an iterative manner to continually tune the waveguide during the application of microwave radiation so as to continually improve impedance matching while the impedance of the head changes due to heating.

11. The apparatus of claim 1, wherein the stunning station includes a head positioner to locate and present to the applicator the subject animal's head in a defined position.

12. The apparatus of claim 11, wherein the head positioner includes at least one of:
 a head tilter mechanism to lift the animal's head by tilting it upwardly to present the application point to the applicator, the head tilter comprising a chin lifting member to lift the chin or lower jaw of the animal upwardly and tilt the head backwardly to present the application point to the applicator,
 a neck lifter selectively operable to raise the animal's head (without necessarily tilting of the head) by lifting force applied from beneath to the neck of the animal, thereby raising the head towards the applicator particularly enabling different height animals to be processed, and
 a body lifter selectively operable to raise the animal's body (without necessarily separately lifting or tilting of the head or lifting the neck) by lifting force applied from beneath to the body of the animal, thereby raising the head towards the applicator particularly enabling different height animals to be processed.

13. The apparatus of claim 1, wherein the stunning station includes a body support for the subject animal operative to support the animal during the application of the microwave energy in the event that the animal starts to slump or fall at the onset of insensibility.

14. The apparatus of claim 1, wherein the stunning station includes microwave shielding surrounding at least the position of the animal head when the animal is in its confined position thereby forming a Faraday cage, the shielding having an opening for locating the animal's head.

15. A method of stunning an animal for inducing substantially immediate unconsciousness and insensibility enabling processing or handling of the animal, the method comprising:
 introducing a live subject animal to be processed or handled to a stunning station and locating the animal in a generally confined position,
 locating an applicator in contact with an application point on the subject animal's head immediately overlying the frontal portion of the subject animal's brain, the applicator having a coupling conformation to couple microwave radiation through the applicator to the head and to the frontal portion of the brain of the subject animal, and
 generating microwave radiation of a suitable power level and frequency and directing that radiation through a waveguide to the applicator at an operative end of the waveguide to thereby heat the frontal portion of the brain of the subject animal,
 wherein the application of the microwave radiation to effect the heating is continued for a period of time to raise the temperature of the frontal portion of the brain, the period being
 sufficient only to rapidly induce insensibility, and insufficient
 (i) for the insensibility induced to be irreversible, and
 (ii) to cause significant heating of deeper brain tissues and including the brain stem.

16. The method according to claim 15, wherein the application point is medially located on the head of the subject animal above a line extending between the animal's eyes so as to be located at the closest external point to the central and frontal portion of the brain.

17. The method according to claim 15, wherein the microwave radiation has properties selected from:
 microwave radiation having its electric field generally perpendicular to the front of the animal's head at the application point whereby the electric field enters the animal's head in a generally perpendicular direction, and
 microwave radiation having both its electric field and magnetic field generally parallel to the front of the animal's head at the application point and whereby the microwave radiation enters the animal head in the generally perpendicular direction.

18. The method according to claim 15, wherein the frontal portion of the brain of the subject animal is heated to satisfy at least one of the conditions:
 the temperature increases by an amount in the range of about 5° C. to about 10° C., and
 the temperature increases to about 43° C.

19. The method according to claim 15, wherein, while the animal is in the unconscious and insensible state, performing the further step of slaughtering the animal in a manner compliant with religious ritual slaughter criteria prescribed for Muslim "Halal" slaughter or for Judaic "Shechita" slaughter.

20. An animal stunning apparatus for rapidly inducing unconsciousness and insensibility enabling processing or handling of a subject animal, the apparatus comprising:
 a stunning station to which a live subject animal to be processed or handled is introduced, the stunning station being arranged to locate the subject animal in a confined position, the stunning station including a head positioner to locate and present the subject animal's head in a defined position;
 an applicator located relative to the subject animal's head when in its defined position so as to contact an application point on the live subject animal's head immediately overlying a frontal portion of the animal's brain, the application point being medially located on the head of the subject animal above a line extending between the animal's eyes so as to be located at the closest external point to the central and frontal portion of the brain, the applicator having a coupling conformation to couple microwave radiation therethrough to the head and to the frontal portion of the brain of the subject animal when in the confined position at the stunning station, the applicator having an opening therein through which the microwave radiation from the waveguide is coupled to the animal's head at the application point, the peripheral portions of the applicator defining the opening contacting the animal's head to surround the application point when the applicator is in its operative position;
 a microwave generator for generating and radiating microwave energy of a suitable power level and frequency, and a waveguide coupled to the generator so as to receive and direct the microwave radiation to the applicator located at an operative end of the waveguide so as to thereby heat the frontal portion of the brain of the subject animal beneath the application point which the applicator contacts in use, stunning station including microwave shielding surrounding at least the position of the animal head when the animal is in its confined position thereby forming a Faraday cage, the shielding having an opening in which the animal's head is located; and a switch operable so as to discontinue the application of microwave radiation effecting heating of the frontal portion of the brain after a period of time sufficient to have raised the temperature of the frontal portion of the brain of the subject animal to thereby induce the unconsciousness and insensibility.

* * * * *